Patented July 30, 1935

2,009,396

UNITED STATES PATENT OFFICE 2,009,396

DIAMINOSTILBENE DERIVATIVES AND METHODS FOR THEIR PREPARATION

Richard Frank Goldstein, Prestwich, England, assignor to Imperial Chemical Industries Limited, a corporation of Great Britain No Drawing. Original application May 24, 1932, Serial No. 613,265. Divided and this application July 28, 1933, Serial No. 682,630. In Great Britain May 29, 1931

11 Claims.  (Cl. 260—124)

This invention relates to a new group of dye intermediates and methods for their preparation. More particularly it refers to dye intermediates having the following general formula:

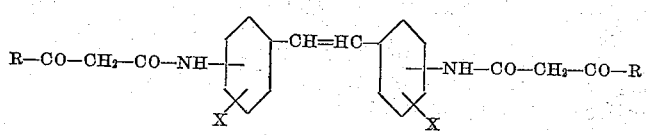

wherein R represents an alkyl group and X represents hydrogen or a halogen group.

This application is a division of my previous application Serial No. 613,265, filed May 24, 1932.

It is an object of the present invention to produce dye intermediates which are exceptionally well adapted for use in the production of azo colors, and which may be used for numerous other purposes. An additional object is to produce new compounds having very desirable physical and chemical properties. Additional objects will become apparent by a consideration of the following disclosure.

These objects are attained by the process of the present invention wherein a diamino-stilbene, preferably 4-4'-diamino-stilbene or derivatives thereof, is reacted with an acylacetic ester. This reaction may be conveniently effected by heating a mixture of a diamino-stilbene, an acylacetic ester and a solvent or diluent, to which has preferably been added a tertiary organic base, such as pyridine.

The invention may be more completely understood by a consideration of the following illustrative examples in which the quantities are stated in parts by weight:

Example 1

15 parts of ethyl acetoacetate, 66 parts of chlorobenzene, 0.05 part of pyridine were mixed together and boiled in a reflux apparatus while a suspension of 10 parts of 4,4'-diamino-stilbene in 55 parts of chlorobenzene and 0.05 part of pyridine was slowly run in. The eventual mixture was then slowly distilled per descensum (with a turned down condenser) until about 55 parts of distillate had been collected. The residue was cooled and filtered. The solid so obtained 4,4'-diacetoacetyl-diamino-stilbene was a yellow crystalline substance.

10 grams of 4,4'-diacetoacetyl-diamino-stilbene were pasted with 30 cc. Turkey red oil and 25 cc. caustic soda 62° Tw. The paste was warmed and dissolved by the addition of 200 cc. boiling water. The solution was heated until clear then diluted to 1000 cc. total volume. Bleached cotton piece was impregnated by one passage through the above solution, squeezed and dried.

The padded material was developed by working in a solution of 6-chloro-o-toluidine, diazotized and neutralized with sodium acetate in the usual manner. The dyeing was finally given a soaping after treatment for 30 minutes at the boil in a solution containing 3 grms. soap flakes and 2 grms. soda ash per litre. A bright yellow of exceptional fastness to kier-boiling was obtained.

Example 2

105 parts of ethyl acetoacetate, 9.7 parts of 2-2'-dichloro-4,4'-diamino-stilbene and 116 parts of chlorobenzene were mixed and heated rapidly to boiling. 89 parts of distillate were taken off slowly, and the residue in the flask was then cooled and filtered. The solid was purified by solution in aqueous sodium hydroxide and reprecipitated, 12.0 parts of 2-2'-dichloro-4-4'-diacetoacetyl-diamino-stilbene, m. p. 187° C., being obtained.

3 grams of 2,2'-dichloro-4,4'-diacetoacetyl-diamino-stilbene were pasted with 9 cc. of Turkey red oil and 1.5 cc. of caustic soda liquor 62° Tw. The paste was dissolved by the addition of 60 cc. of boiling water and the solution made up to 1000 cc. with cold water. 14 grams of sodium chloride were added before padding. Bleached cotton pieces were impregnated in the above solution for ½ hour at 25° C. (using a 20:1 liquor).

The padded material was developed in a solution of diazotized o-chloroaniline neutralized with sodium acetate in the usual manner. The dyeing was finally given a soaping after treatment for 30 minutes at the boil in a solution containing 3 grams soap flakes and 2 grams soda ash per litre. A bright yellow of excellent fastness to kier-boiling and severe chemicking was obtained.

It is, of course, to be understood that the method of producing the diacylacetyl-diamino-stilbenes may be subjected to wide variations, both as regards compounds and assistants used, as well as the proportions of substances, conditions of temperature, and time of reaction. Any process wherein a diacylacetyl-diamino-stilbene may be produced from a diamino-stilbene and an acylacetyl ester is applicable hereto, although the processes previously described are preferred, due to the ease with which the reaction is carried out and the high yield of products obtained therefrom.

In place of the diamino-stilbene there may be substituted derivatives thereof, for example halogenated derivatives such as dichloro-diamino-stilbene and dibromo-diamino-stilbene. Other derivatives which do not impair the physical and chemical properties of the resulting compounds may also be used without departing from the scope of the present invention.

It is also to be understood that the invention is not limited to the use of ethyl-aceto-acetate, since numerous other acylacetic esters may be substituted therefor. Likewise, the selection of diluents or solvents is susceptible to wide variation, other well known solvents such as toluene and xylene being permissible. The use of a tertiary organic base such as pyridine is optional, although the results obtained where such tertiary organic base is used appear to be somewhat more satisfactory than where the use of such base is omitted.

The molecular ratio of the acylacetic ester to the diamino-stilbene is preferably 2:1 respectively, although it is quite possible to vary this ratio within rather wide limits, without decreasing, to an appreciable extent, the superiority of the product produced by the present process.

The products of the present invention have exceptionally satisfactory chemical and physical properties. They are particularly well adapted for use as coupling components in the production of azo dyes. They may be coupled with diazotized aromatic amino compounds, by first impregnating cotton material with solutions of the products described herein and then developing with the diazo salt. These diazo salts may be selected from a wide range of aromatic amino compounds, but it is advisable that they should be free from sulfo or carboxy groups. With the exception of sulfo and carboxy groups the aromatic amino compounds may have substituted thereon one or more of the various substituent groups well known to one skilled in the art. Among these substituents may be mentioned the alkyl, alkoxy, halogen, and nitro groups. The dyes produced are surprisingly fast to kier-boiling and chemicking.

As many apparently widely different embodiments of this invention may be made without departing from the spirit and scope thereof, it is to be understood that I do not limit myself to the specific embodiments thereof except as defined in the appended claims.

I claim:

1. A process for producing an organic compound which comprises reacting an acylacetic ester with 4,4'-diamino-stilbene, which may have substituted on each of the phenylene radicals a halogen group.

2. The process of claim 1 when carried out in the presence of an organic solvent, to which may be added a tertiary organic base.

3. A process for producing an organic compound which comprises reacting ethyl-aceto-acetate with 4,4'-diamino-stilbene, which may have substituted on each of the phenylene radicals a halogen group.

4. The process of claim 3 when carried out in the presence of a mixture of chlorobenzene and pyridine.

5. A process for producing an organic compound which comprises reacting ethyl-aceto-acetate with 4,4'-diamino-stilbene in the presence of chlorobenzene and pyridine.

6. A process for producing an organic compound which comprises reacting ethyl-aceto-acetate with 2,2'-dichloro-4,4'-diamino-stilbene in the presence of chlorobenzene.

7. An organic compound having the following general formula:

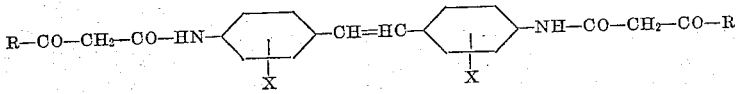

wherein R represents an alkyl group and X represents hydrogen or a halogen group.

8. An organic compound having the following general formula:

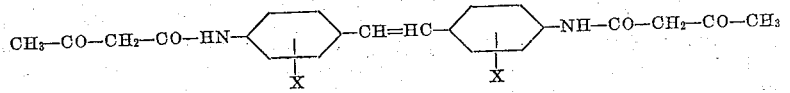

wherein X represents hydrogen or a halogen group.

9. An organic compound having the following general formula:

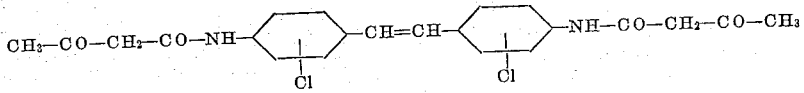

10. An organic compound having the following formula:

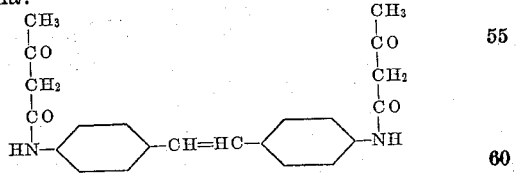

11. An organic compound having the following formula:

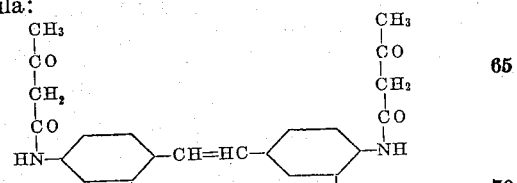

RICHARD FRANK GOLDSTEIN.

Certificate of Correction

Patent No. 2,009,396.    July 30, 1935.

RICHARD FRANK GOLDSTEIN

It is hereby certified that error appears in the printed specification of the above numbered patent requiring correction as follows: Page 2, second column, lines 63 to 70, inclusive, claim 11, strike out the formula and insert instead—

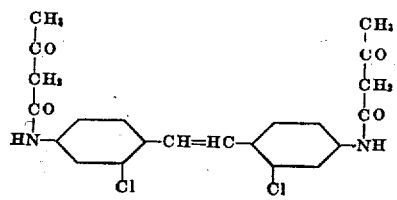

and that the said Letters Patent should be read with this correction therein that the same may conform to the record of the case in the Patent Office.

Signed and sealed this 17th day of September, A. D. 1935.

[SEAL]

LESLIE FRAZER,
*Acting Commissioner of Patents.*